(12) United States Patent
Yukikata et al.

(10) Patent No.: US 11,975,411 B2
(45) Date of Patent: May 7, 2024

(54) FLUX AND SOLDER PASTE

(71) Applicant: KOKI Company Limited, Tokyo (JP)

(72) Inventors: Kazuhiro Yukikata, Tokyo (JP); Noriyoshi Uchida, Tokyo (JP)

(73) Assignee: KOKI Company Limited, Tokyo (JP)

( * ) Notice: Subject to any disclaimer, the term of this patent is extended or adjusted under 35 U.S.C. 154(b) by 360 days.

(21) Appl. No.: 17/423,926

(22) PCT Filed: Jan. 23, 2020

(86) PCT No.: PCT/JP2020/002252
§ 371 (c)(1),
(2) Date: Jul. 19, 2021

(87) PCT Pub. No.: WO2020/153418
PCT Pub. Date: Jul. 30, 2020

(65) Prior Publication Data
US 2022/0009042 A1   Jan. 13, 2022

(30) Foreign Application Priority Data
Jan. 24, 2019 (JP) ................. 2019-010154

(51) Int. Cl.
*B23K 35/00* (2006.01)
*B23K 35/02* (2006.01)
*B23K 35/362* (2006.01)
*C22C 13/00* (2006.01)

(52) U.S. Cl.
CPC .......... *B23K 35/362* (2013.01); *B23K 35/025* (2013.01); *C22C 13/00* (2013.01)

(58) Field of Classification Search
CPC .... B23K 35/362; B23K 35/025; B23K 35/26; B23K 1/203; B23K 3/082; B23K 35/34; B23K 35/365; B23K 35/368; B23K 3/0638; C22C 13/00
USPC ............. 228/33, 37, 41, 223–224, 214, 207, 228/248.1–248.5
See application file for complete search history.

(56) References Cited

U.S. PATENT DOCUMENTS

| 2018/0072923 | A1* | 3/2018 | Matsuura | C09J 5/06 |
| 2018/0358318 | A1* | 12/2018 | Shearer | B23K 35/26 |
| 2019/0015937 | A1* | 1/2019 | Nakaji | C08L 93/04 |

FOREIGN PATENT DOCUMENTS

| CN | 103797139 A | * | 5/2014 | ........ B23K 35/0233 |
| CN | 104107989 A | * | 10/2014 | ........ B23K 35/268 |
| CN | 104148821 A | * | 11/2014 | ........ B23K 35/3613 |
| CN | 104416297 A | * | 3/2015 | ........ B23K 35/262 |
| CN | 104416298 A | * | 3/2015 | ........ B23K 35/3613 |
| CN | 104416299 A | * | 3/2015 | ........ B23K 35/3613 |
| CN | 104476016 A | * | 4/2015 | ........ B23K 35/3612 |
| CN | 104526185 A | * | 4/2015 | ........ B23K 35/362 |
| CN | 104889596 A | * | 9/2015 | |
| CN | 105618953 A | * | 6/2016 | |
| CN | 106001998 A | * | 10/2016 | |
| CN | 106271221 A | * | 1/2017 | ......... B23K 35/362 |
| CN | 106312361 A | * | 1/2017 | |
| CN | 106660116 A | * | 5/2017 | ............ B22F 1/0014 |
| CN | 107322187 A | * | 11/2017 | ........... B23K 35/025 |
| CN | 107695561 A | * | 2/2018 | |
| CN | 107931891 A | * | 4/2018 | ........... B23K 35/025 |
| CN | 108526758 A | * | 9/2018 | |
| CN | 108544140 A | * | 9/2018 | ........... B23K 35/268 |
| CN | 108788164 A | * | 11/2018 | ............ B22F 1/0003 |
| CN | 108941971 A | * | 12/2018 | ............ B23K 35/26 |
| CN | 109366041 A | * | 2/2019 | ........ B23K 35/3613 |
| CN | 109664048 A | * | 4/2019 | ........... B23K 35/025 |
| CN | 109848603 A | * | 6/2019 | |
| CN | 110202292 A | * | 9/2019 | ............ B23K 35/26 |
| CN | 110202293 A | * | 9/2019 | ............ B23K 35/26 |
| CN | 110202295 A | * | 9/2019 | ........ B23K 35/3612 |
| CN | 110732806 A | * | 1/2020 | ........ B23K 35/0222 |
| EP | 3530397 A1 | * | 8/2019 | ........ B23K 35/3612 |
| JP | 09-327792 | | 12/1997 | |
| JP | 10-249577 | | 9/1998 | |
| JP | 2004-202518 | | 7/2004 | |
| JP | 2005528224 A | * | 9/2005 | |
| JP | 2006-167802 | | 6/2006 | |
| JP | 2006-205203 | | 8/2006 | |
| JP | 2006-305631 | | 11/2006 | |
| JP | 2007-190583 | | 8/2007 | |
| JP | 2007-245157 | | 9/2007 | |
| KR | 20150111403 A | * | 10/2015 | |
| KR | 20180068972 A | * | 6/2018 | |
| KR | 20180071441 A | * | 6/2018 | |
| TW | 201223679 | | 6/2012 | |
| TW | 201622869 | | 7/2016 | |
| WO | WO-2015155542 A1 | * | 10/2015 | ............ B22F 1/0003 |
| WO | WO-2015193684 A1 | * | 12/2015 | ........... B23K 1/0016 |
| WO | WO-2016103526 A1 | * | 6/2016 | ........... B23K 1/0016 |
| WO | WO-2016158693 A1 | * | 10/2016 | ............... B22F 1/00 |
| WO | WO-2017154329 A1 | * | 9/2017 | ............ B22F 1/0003 |
| WO | WO-2017154330 A1 | * | 9/2017 | ............ B22F 1/0014 |
| WO | WO-2019172410 A1 | * | 9/2019 | ........... B23K 1/0016 |
| WO | WO-2020153418 A1 | * | 7/2020 | ........... B23K 35/025 |

* cited by examiner

*Primary Examiner* — Kiley S Stoner
(74) *Attorney, Agent, or Firm* — Clark & Brody LP

(57) ABSTRACT

A flux according to the present invention is a flux used for soldering that includes: a thixotropic agent including a polyamide compound that has UV absorption at the wavelength range of 240 to 500 nm in UV-visible absorption spectra; and a solvent including a glycol ether-based solvent.

20 Claims, No Drawings

FLUX AND SOLDER PASTE

CROSS-REFERENCE TO RELATED APPLICATION

This application claims priority to Japanese Patent Application No. 2019-10154, the disclosure of which is incorporated herein by reference in its entirety.

FIELD

The present invention relates to a flux used for soldering, and a solder paste including the flux.

BACKGROUND

A solder paste in which a solder alloy and a flux are mixed together is used to join parts to be joined to an electronic circuit board such as a printed wiring board. The solder paste is applied to an electrode portion on a surface of the electronic circuit board, and heated (reflowed) while the electrode portion is in contact with the electrode portion of the part to be joined. Thereby, the solder alloy melts to form a solder joint portion, and the board and the part to be joined are joined together via the solder joint portion.

Conventionally, a joining method using a solder paste has a problem of occurrence of a phenomenon of scattering a fine spherical solder paste (hereinafter, also referred to as solder balls) around the electrode portion of the part to be joined when reflow is carried out. In order to suppress the occurrence of scattering solder balls, for example, Patent Literature 1 discloses a solder paste in which a flux and formed by mixing a flux and an eutectic solder alloy including lead together, in which aminobenzoate is used as an activator included in the flux.

CITATION LIST

Patent Literature

Patent Literature 1: JP H9-327792 A

SUMMARY

Technical Problem

In recent years, a lead-free alloy (alloy containing no lead) has been used as a solder alloy included in a solder paste in terms of environmental load. Examples of the lead-free alloy include an Sn—Ag—Cu-based alloy (SAC-based alloy), an Sn—Cu-based alloy, an Sn—Bi-based alloy, and an Sn—Zn-based alloy. Since such a lead-free solder alloy has a higher melting point than the eutectic solder alloy, there was a problem that solder balls are likely to occur when the lead-free solder alloy is used together with a conventional flux.

The present invention has been conceived in view of the above circumstances, and it is an object of the present invention to provide a flux capable of suppressing the occurrence of solder balls when used together with a solder alloy, and a solder paste including the flux.

Solution to Problem

A flux according to the present invention is a flux used for soldering, the flux including: a thixotropic agent including a polyamide compound that has UV absorption at the wavelength range of 240 to 500 nm in UV-visible absorption spectra; and a solvent including a glycol ether-based solvent.

It is preferable that the content of the polyamide compound in the flux according to the present invention be 0.1 to 10 mass % based on the entire flux.

In the flux according to the present invention, it is preferable that the glycol ether-based solvent be at least one selected from the group consisting of hexyl diglycol, 2-ethylhexyl diglycol, tripropylene glycol monobutyl ether, dipropylene glycol mono-n-butyl ether, and triethylene glycol monobutyl ether.

It is preferable that the content of the glycol ether-based solvent in the flux according to the present invention be 20 to 60 mass % based on the entire flux.

A solder paste according to the present invention includes the flux described above and a solder alloy.

In the solder paste according to the present invention, the solder alloy may be a lead-free solder alloy.

DESCRIPTION OF EMBODIMENTS

Hereinafter, a flux and a solder paste according to an embodiment of the present invention will be described.

<Flux>

(Thixotropic Agent)

The flux according to this embodiment includes, as a thixotropic agent, a polyamide compound that has UV absorption at the wavelength range of 240 to 500 nm in UV-visible absorption spectra. A maximum absorption wavelength in UV-visible absorption spectra of such a polyamide compound is preferably 240 to 500 nm, more preferably 240 to 300 nm. Examples of the polyamide compound that has UV absorption at the wavelength range of 240 and 500 nm in UV-visible absorption spectra include an aromatic polyamide compound (semiaromatic polyamide compound or wholly aromatic polyamide compound) having a cyclic compound such as a benzene ring or a naphthalene ring in the main chain. These may be individually used, or two or more of them may be used in combination. Examples of the polyamide compound include JH-180 (manufactured by Itoh Oil Chemicals Co., Ltd.), MX-Nylon #6000, MX-Nylon s6000, MX-Nylon k6000, MX-Nylon #7000, MX-Nylon s7000, MX-Nylon k7000 (all manufactured by Mitsubishi Gas Chemical Company, Inc.), ARLEN (manufactured by Mitsui Chemicals, Inc.), Vestamide HT plus M1000, and Vestamide HT plus M3000 (both manufactured by Daicel-Evonik Ltd.) (all, product names). Among these, the polyamide compound described above is preferably JH-180 in terms of the melting temperature of the polyamide compound, the solubility to the flux, and the ease in handling.

Here, UV-visible absorption spectra can be measured by a conventionally known method, for example, a method using an ultraviolet-visible near-infrared spectrophotometer (V-670 manufactured by JASCO Corporation) in the following conditions.

Measuring solvent: 1,1,1,3,3,3-Hexafluoro-2-propanol
Sample concentration: 1 mg/mL
Scanning speed: 400 nm/min
Start wavelength: 500 nm
End wavelength: 240 nm The content of the polyamide compound is preferably 0.1 mass % or more, more preferably 1.0 mass % or more based on the entire flux. The content of the polyamide compound is preferably 10 mass % or less, more preferably 7.0 mass % or less based on the entire flux. In the case where two or more different polyamide compounds are included, the content means the total content of the polyamide compounds.

The flux according to this embodiment may include another thixotropic agent different from the polyamide compounds. The other thixotropic agent is not particularly limited, and examples thereof include a bisamide compound, an aliphatic polyamide compound, a hardened castor oil, kaolin, a colloidal silica, an organic bentonite, and a glass frit. These may be individually used, or two or more of them may be used in combination. The content of the other thixotropic agent is preferably 80 mass % or less, more preferably 40 mass % or less based on the entire thixotropic agents, and it is still more preferable that the other thixotropic agent be not included.

(Solvent)

The flux according to this embodiment include a glycol ether-based solvent as a solvent. The glycol ether-based solvent herein means a solvent having both a hydroxyl group and an ether group in a molecule. Examples of the glycol ether-based solvent include hexyl diglycol, 2-ethyl hexyl diglycol, tripropylene glycol monobutyl ether, dipropylene glycol mono-n-butyl ether, triethylene glycol monobutyl ether, diethylene glycol dibutyl ether (dibutyl diglycol), diethylene glycol monobutyl ether (butyl diglycol), ethylene glycol monophenyl ether (phenyl glycol), diethylene glycol monophenyl ether (phenyl diglycol), and propylene glycol monophenyl ether (phenyl propylene glycol). Among these, the glycol ether-based solvent is preferably at least one selected from the group consisting of hexyl diglycol, 2-ethyl hexyl diglycol, tripropylene glycol monobutyl ether, dipropylene glycol mono-n-butyl ether, and triethylene glycol monobutyl ether. The glycol ether-based solvents may be individually used, or two or more of them may be used in combination.

The content of the glycol ether-based solvent is preferably 20 mass % or more, more preferably 60 mass % or more based on the entire flux. The content of the glycol ether-based solvent is preferably 35 mass % or less, more preferably 45 mass % or less based on the entire flux. In the case where two or more different glycol ether-based solvents are included, the content means the total content of the glycol ether-based solvents.

The flux according to this embodiment may include any other solvent different from the glycol ether-based solvents. The other solvent is not particularly limited, and examples thereof include: aliphatic compounds such as n-hexane, isohexane, or n-heptane; esters such as isopropyl acetate, methyl propionate, or ethyl propionate; ketones such as methyl ethyl ketone, methyl-n-propyl ketone, or diethyl ketone; and alcohols such as ethanol, n-propanol, isopropanol, isobutanol, or octanediol. These may be individually used, or two or more of them may be used in combination. The content of the other solvent is preferably 80 mass % or less, more preferably 40 mass % or less based on the entire solvents, and it is still more preferable that the other solvent be not included.

(Resin)

The flux according to this embodiment may further include a resin in terms of improving solder wettability. Examples of the resin include a rosin-based resin and a synthetic resin. The rosin-based resin is not particularly limited, and, for example, at least one or more rosin-based resins selected from a rosin and a rosin derivative (for example, a hydrogenated rosin, a polymerized rosin, a disproportionated rosin, and an acrylic acid modified rosin) can be used. The synthetic resin is not particularly limited, and a known synthetic resin can be used. Among these, the resin is preferably one or more selected from a hydrogenated rosin, an acid modified rosin, and a rosin ester in terms of activating the flux. These resins may be individually used, or two or more of them may be used in combination.

The content of the resin is preferably 30 mass % or more, more preferably 40 mass % or more based on the entire flux. The content of the resin is preferably 70 mass % or less, more preferably 50 mass % or less based on the entire flux. In the case where two or more different resins are included, the content means the total content of the resins.

(Activator)

The flux according to this embodiment may further include an activator in terms of improving the meltability of the solder. The activator is not particularly limited, and, for example, an organic acid, a halogen compound, an amine halogen salt, or a vinyl ether polymer can be used. Examples of the organic acid include glutaric acid, adipic acid, azelaic acid, sebacic acid, stearic acid, benzoic acid, dodecanedioic acid, succinic acid, maleic acid, and isocyanuric acid. Examples of the halogen compound include 2,3-dibromo-2-buten-1,4-diol, and tris(2,3-dibromopropyl)isocyanuric acid. Examples of the amine of the amine halogen salt include diethylamine, dibutylamine, tributylamine, diphenylguanidine, and cyclohexylamine. Examples of the halogen of the amine halogen salt include a fluorine-based compound, a chlorine-based compound, a bromine-based compound, and an iodine-based compound. These activators may be individually used, or two or more of them may be used in combination.

The content of the activator is preferably 0.5 mass % or more, more preferably 2.0 mass % or more based on the entire flux. The content of the activator is preferably 20 mass % or less, more preferably 10 mass % or less based on the entire flux. In the case where two or more different activators are included, the content means the total content of the activators.

The flux according to this embodiment may include, for example, an antioxidant, a surfactant, a defoamer, or a corrosion inhibitor, as another additive.

The flux according to this embodiment can suppress the occurrence of solder balls when used together with a solder alloy since it includes a thixotropic agent including a polyamide compound that has UV absorption at the wavelength range of 240 to 500 nm in UV-visible absorption spectra, and a solvent including a glycol ether-based solvent.

The flux according to this embodiment, in which the content of the polyamide compound is 0.1 to 10 mass % based on the entire flux, can further suppress the occurrence of solder balls when used together with a solder alloy.

The flux according to this embodiment can further suppress the occurrence of solder balls when used together with a solder alloy since the glycol ether-based solvent is at least one selected from the group consisting of hexyl diglycol, 2-ethylhexyl diglycol, tripropylene glycol monobutyl ether, dipropylene glycol mono-n-butyl ether, and triethylene glycol monobutyl ether.

The flux according to this embodiment, in which the content of the glycol ether-based solvent is 20 to 60 mass % based on the entire flux, can further suppress the occurrence of solder balls when used together with a solder alloy.

The flux according to this embodiment can be obtained by, for example, putting a solvent and a thixotropic agent, and, as appropriate, a resin, an activator and another additive, into a heating container, followed by heating all these raw materials to 160 to 180° C. to melt them, and finally cooling them to room temperature.

<Solder Paste>

The solder paste according to this embodiment includes the aforementioned flux and a solder alloy. More specifically, the solder paste is obtained by mixing solder alloy powder and the flux. The content of the flux is preferably 5 to 20 mass % based on the entire solder paste. The content of the solder alloy powder is preferably 80 to 95 mass % based on the entire solder paste.

The solder alloy is not particularly limited, and examples thereof include a lead-free solder alloy and a lead solder alloy. In terms of reducing the environmental load, a lead-free solder alloy is preferable. Examples of the lead-free solder alloy include an alloy including tin, silver, copper, indium, zinc, bismuth, antimony, or the like. More specifically, they include alloys of Sn/Ag, Sn/Ag/Cu, Sn/Cu, Sn/Ag/Bi, Sn/Bi, Sn/Ag/Cu/Bi, Sn/Sb, Sn/Zn/Bi, Sn/Zn, Sn/Zn/Al, Sn/Ag/Bi/In, Sn/Ag/Cu/Bi/In/Sb, In/Ag, or the like.

The solder paste according to this embodiment can suppress the occurrence of solder balls due to the inclusion of the aforementioned flux and a solder alloy.

The solder paste according to this embodiment can suppress the occurrence of solder balls even in the case where the solder alloy is a lead-free solder alloy.

EXAMPLES

Hereinafter, examples of the present invention will be described. However, the present invention is not limited to the following examples.

<Preparation of Solder Paste>

Raw materials in the mixing amounts shown in Table 1 were put into a heating container and heated to 180° C. so that all the raw materials were molten. Thereafter, they were cooled to room temperature to obtain uniformly dispersed fluxes. The mixing amounts shown in Table 1 are respectively equal to the contents of the corresponding components included in each flux. Next, mixing was made to have 11.8 mass % of each flux and 88.2 mass % of solder powder (Sn—3.0 wt % of Ag—0.5 wt % of Cu) to obtain a solder paste of each of Examples and each of Comparative Examples.

TABLE 1

| | | | Presence or absence of UV absorption in UV-visible absorption spectra (Wavelength range of 240 to 500 nm) | Examples | | | | | | | | Comparative Examples | | | | |
|---|---|---|---|---|---|---|---|---|---|---|---|---|---|---|---|---|
| | | | | 1 | 2 | 3 | 4 | 5 | 6 | 7 | 8 | 1 | 2 | 3 | 4 | 5 |
| Mixing amoung (mass %) | Resin | KE-604 | — | 52.1 | 52.1 | 52.1 | 52.1 | 52.1 | 53.3 | 52.8 | 51.5 | 52.1 | 52.1 | 52.1 | 52.8 | 52.1 |
| | Thixotropic agent | Polyamide compound | Present (max. absorpt. WL 260 nm) | 3.7 | 3.7 | 3.7 | 3.7 | 3.7 | 1.6 | 2.6 | 5.1 | — | — | 3.7 | 2.6 | 3.7 |
| | | J-530 | Absent | — | — | — | — | — | — | — | — | 3.7 | — | — | — | — |
| | | TALEN VA-79 | Absent | — | — | — | — | — | — | — | — | — | 3.7 | — | — | — |
| | Solvent | Hexyl diglycol | — | 41.8 | — | — | — | — | — | — | — | — | — | — | — | — |
| | | 2-Ethylhexyl diglycol | — | — | 41.8 | — | — | — | — | — | — | 41.8 | 41.8 | — | — | — |
| | | DAWANOL TPnB | — | — | — | 41.8 | — | — | — | — | — | — | — | — | — | — |
| | | Butyl propylene diglycol | — | — | — | — | 41.8 | — | 42.7 | 42.2 | 41.1 | — | — | — | — | — |
| | | Butyl triglycol | — | — | — | — | — | 41.8 | — | — | — | — | — | — | — | — |
| | | Dimethyl tetraglycol | — | — | — | — | — | — | — | — | — | — | — | 41.8 | 42.2 | — |
| | | Octanediol | — | — | — | — | — | — | — | — | — | — | — | — | — | 41.8 |
| | Activator | Adipic acid | — | 0.3 | 0.3 | 0.3 | 0.3 | 0.3 | 0.3 | 0.3 | 0.3 | 0.3 | 0.3 | 0.3 | 0.3 | 0.3 |
| | | Sebacic acid | — | 1.6 | 1.6 | 1.6 | 1.6 | 1.6 | 1.6 | 1.6 | 1.5 | 1.6 | 1.6 | 1.6 | 1.6 | 1.6 |
| | | TAIC68 | — | 0.5 | 0.5 | 0.5 | 0.5 | 0.5 | 0.5 | 0.5 | 0.5 | 0.5 | 0.5 | 0.5 | 0.5 | 0.5 |
| Evaluation results | Occurrence of solder balls | Number of pieces (pieces) | 1 | 2 | 0 | 0 | 0 | 1 | 2 | 0 | 9 | 11 | 6 | 9 | — |
| | | Judgment | Good | Good | Good | Good | Good | Good | Good | Good | Poor | Poor | Poor | Poor | — |

Details of each of the raw materials shown in Table 1 are described below.

KE-604: Acid-modified rosin, product name "KE-604" manufactured by Arakawa Chemical Industries, Ltd.

Polyamide compound: Polyamide compound that has UV absorption at the wavelength range of 240 to 500 nm in UV-visible absorption spectra (maximum absorption wavelength: 260 nm)

J-530: Bisamide compound manufactured by Itoh Oil Chemicals Co., Ltd.

TALEN VA-79: Aliphatic polyamide compound manufactured by Kyoseisha Chemical Co., Ltd.

Hexyl diglycol: Hexyl diglycol manufactured by Nippon Nyukazai Co., Ltd.

2-Ethylhexyl diglycol: 2-Ethylhexyl diglycol manufactured by Nippon Nyukazai Co., Ltd.

DAWANOL TPnB: Tripropylene glycol monobutyl ether manufactured by The Dow Chemical Company Butyl propylene diglycol: Dipropylene glycol mono-n-butyl ether manufactured by Nippon Nyukazai Co., Ltd.

Butyl triglycol: Triethylene glycol monobutyl ether manufactured by Nippon Nyukazai Co., Ltd.

Dimethyl tetraglycol: Tetraethylene glycol dimethyl ether manufactured by Nippon Nyukazai Co., Ltd.

Octanediol: Octanediol manufactured by KH Neochem Co., Ltd.

Adipic acid: Adipic acid manufactured by Sumitomo Chemical Co., Ltd.

Sebacic acid: Sebacic acid manufactured by Itoh Oil Chemicals Co., Ltd.

TAIC6B: Tris(2,3-dibromopropyl)isocyanuric acid manufactured by Nihon Kasei Co., Ltd.

<Evaluation of Occurrence of Solder Balls>
(Preparation of Test Board)

First, a board having a size of 100 mm×100 mm and a thickness of 1.6 mm was prepared and subjected to a heat treatment in the temperature conditions assuming the time of preheating and the time of solder melting shown in (i) and (ii) below. The heat treatment was carried out in two cycles in order of (i)→(ii)→(i)→(ii).

<Temperature Conditions>
(i) At the time of preheating
Heating rate: 1.0 to 3.0° C./sec
Preheating temperature: 150 to 190° C./60 to 100 sec
Heating environment: Atmosphere
(ii) At the time of solder melting
Heating rate: 1.0 to 2.0° C./sec
Melting temperature: 219° C. or more for 30 sec or more
Heating environment: Atmosphere Subsequently, the solder paste of each of Examples and each of Comparative Examples was applied at two different locations on the surface of the heat treated board. Each of the applied solder pastes had a size of 4.0 mm×3.0 mm in a rectangular shape and a thickness of 120 μm. Next, a part (6330R, product number: RK73B3ATTE130J, manufacturer: KOA Corporation) was mounted so as to bridge over the solder pastes applied at two different locations, and heated in the temperature conditions described above. The heating was carried out in order of (i)→(ii).

(Total Count of Number of Solder Balls)

A radiograph of the position of each test board after heating at which the part had been mounted was taken by using a radiographing apparatus (TUX-3100 manufactured by Mars Tohken Solution Co., Ltd.) was used. The radiographing conditions were a tube voltage of 75.0 V, a tube current of 65.0 μA, a filament current of 3.130 A, and a magnification of 10.9 times. Thereafter, the taken radiograph was visually observed to count the number of solder balls that had occurred. The results are shown in Table 1. The solder paste was judged to be good when the number of solder balls that had occurred was 5 or less.

As can be seen from the results of Table 1, the solder paste of each of Examples meeting all the requirements of the present invention can suppress the occurrence of solder balls.

On the other hand, it can be seen that the solder pastes of Comparative Examples 1 and 2 not including the polyamide compound that have UV absorption at the wavelength range of 240 to 500 nm in UV-visible absorption spectra cause the occurrence of many solder balls.

Also it can be seen that the solder pastes of Comparative Examples 3 and 4 including, as a solvent, dimethyl tetraglycol while not including a glycol ether-based solvent causes the occurrence of many solder balls. Measurement was not performed on Comparative Example 5 including, as a solvent, octanediol while not including a glycol ether-based solvent, since the flux was highly gelled into a rigid solid state and therefore a solder paste could not be produced.

The invention claimed is:

1. A flux used for soldering, the flux comprising:
   a thixotropic agent comprising a polyamide compound that has UV absorption at the wavelength range of 240 to 500 nm in UV-visible absorption spectra; and
   a solvent comprising a glycol ether-based solvent.

2. The flux according to claim 1, wherein
   the content of the polyamide compound is 0.1 to 10 mass % based on the entire flux.

3. The flux according to claim 1, wherein
   the glycol ether-based solvent is at least one selected from the group consisting of hexyl diglycol, 2-ethylhexyl diglycol, tripropylene glycol monobutyl ether, dipropylene glycol mono-n-butyl ether, and triethylene glycol monobutyl ether.

4. The flux according to claim 1, wherein
   the content of the glycol ether-based solvent is 20 to 60 mass % based on the entire flux.

5. A solder paste comprising:
   the flux according to claim 1; and
   a solder alloy.

6. The solder paste according to claim 5, wherein
   the solder alloy is a lead-free solder alloy.

7. The flux according to claim 2, wherein
   the glycol ether-based solvent is at least one selected from the group consisting of hexyl diglycol, 2-ethylhexyl diglycol, tripropylene glycol monobutyl ether, dipropylene glycol mono-n-butyl ether, and triethylene glycol monobutyl ether.

8. The flux according to claim 2, wherein
   the content of the glycol ether-based solvent is 20 to 60 mass % based on the entire flux.

9. The flux according to claim 3, wherein
   the content of the glycol ether-based solvent is 20 to 60 mass % based on the entire flux.

10. The flux according to claim 7, wherein
    the content of the glycol ether-based solvent is 20 to 60 mass % based on the entire flux.

11. A solder paste comprising:
    the flux according to claim 2; and
    a solder alloy.

12. A solder paste comprising:
    the flux according to claim 3; and
    a solder alloy.

13. A solder paste comprising:
the flux according to claim 4; and
a solder alloy.

14. A solder paste comprising:
the flux according to claim 7; and
a solder alloy.

15. A solder paste comprising:
the flux according to claim 8; and
a solder alloy.

16. A solder paste comprising:
the flux according to claim 9; and
a solder alloy.

17. A solder paste comprising:
the flux according to claim 10; and
a solder alloy.

18. The solder paste according to claim 11, wherein the solder alloy is a lead-free solder alloy.

19. The solder paste according to claim 12, wherein the solder alloy is a lead-free solder alloy.

20. The solder paste according to claim 13, wherein the solder alloy is a lead-free solder alloy.

\* \* \* \* \*